United States Patent [19]
Jorgenson et al.

[11] 3,954,203
[45] May 4, 1976

[54] ELECTRIC KETTLE SPOUT FLAP

[76] Inventors: Morris E. Jorgenson, 67 Bythia St., Orangeville, Ontario; Paul B. Sheldon, 48 Tupper St., Brockville, Ontario; Jack A. Sherman, 23 Forest Park; Peter S. Wardell, 63 Rustic Crescent, both of Orangeville, Ontario, all of Canada

[22] Filed: June 27, 1974

[21] Appl. No.: 483,891

[52] U.S. Cl. ............................ 220/334; 222/556
[51] Int. Cl.² .......................................... B65D 51/04
[58] Field of Search ............ 220/32, 334; 222/556; 219/429, 437, 438, 441; D7/62, 64, 65, 66, 67

[56]      References Cited
          UNITED STATES PATENTS

| 889,509 | 6/1908 | Cram | 222/556 |
|---|---|---|---|
| 1,045,993 | 12/1912 | Lucas | 220/334 |
| 1,357,072 | 10/1920 | Mislikowsky | 220/334 |
| 1,610,951 | 12/1926 | Kaul | 220/334 |
| 1,691,160 | 11/1928 | Meuttman | 220/334 |
| 1,964,513 | 6/1934 | Hammer | 220/334 |
| 2,528,191 | 10/1950 | Turner | 219/437 |
| 2,670,107 | 2/1954 | Welden | 222/556 |
| 3,132,580 | 5/1964 | Walker | 219/441 |
| 3,487,200 | 12/1969 | Waller | 219/437 |
| 3,609,298 | 9/1971 | Adamson | 219/437 |

*Primary Examiner*—Ro E. Hart
*Attorney, Agent, or Firm*—R. H. Fox; E. H. Oldham

[57]           ABSTRACT

A spout flap for a water kettle is disclosed which is provided in the spout opening to prevent the user from being scalded by hot steam when pouring hot water from the kettle. The flap is hingedly mounted in the top surface of the kettle adjacent the spout and is counterbalanced such that the flap remains closed when the kettle is in its normal carrying and/or pouring position. When the user desires to fill the kettle, the spout flap may be easily swung inwardly by a slight depressing force of a water faucet.

1 Claim, 3 Drawing Figures

U.S. Patent  May 4, 1976  3,954,203
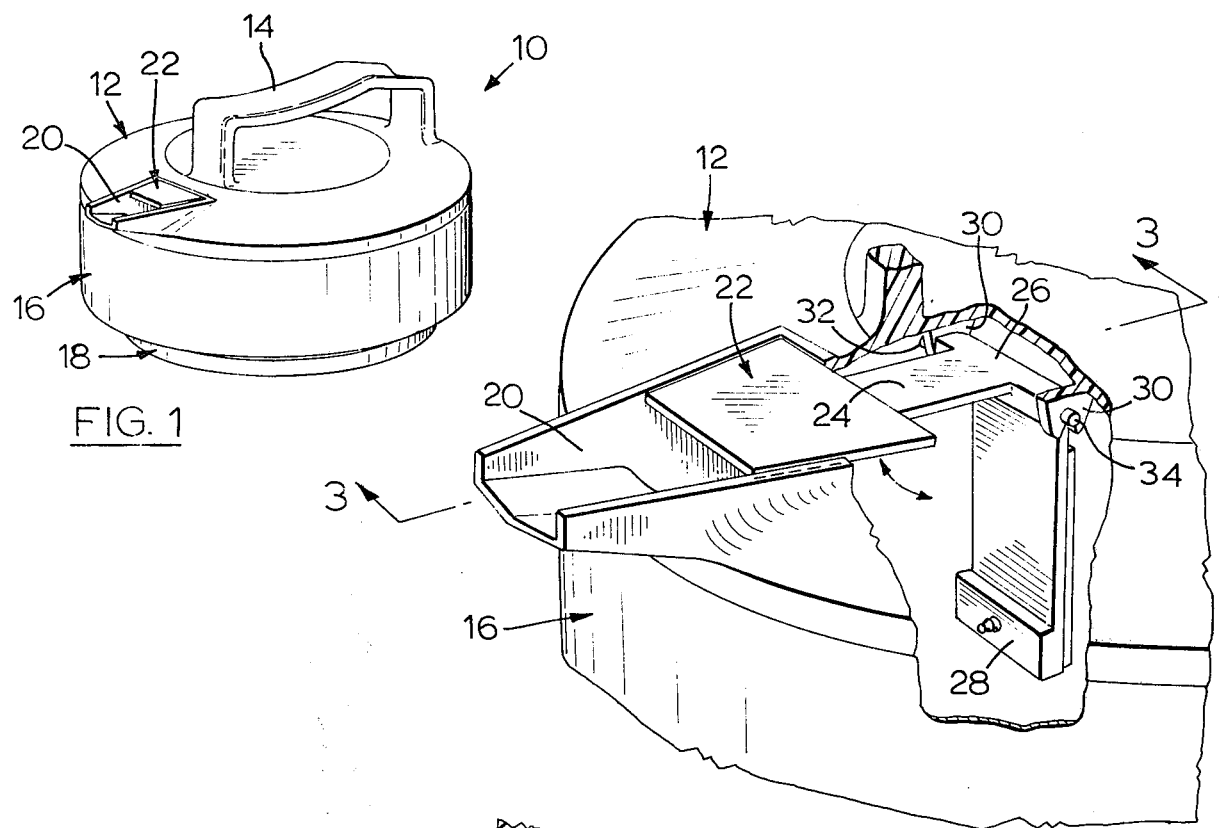
FIG. 1
FIG. 2
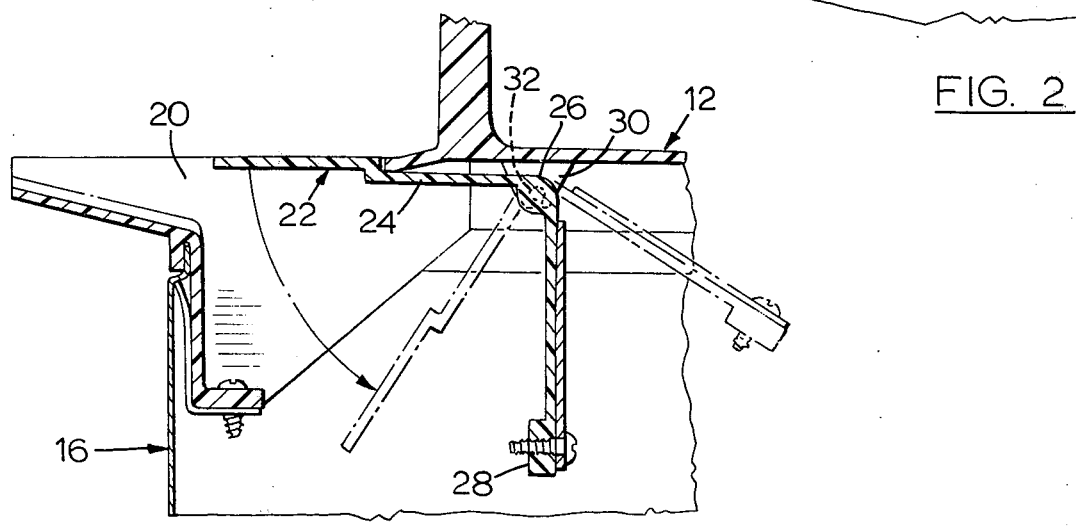
FIG. 3

ELECTRIC KETTLE SPOUT FLAP

BACKGROUND OF THE INVENTION

Vessels used to heat water have been in use by mankind for centuries. The kettle itself in various shapes and forms has been one of mankind's most useful tools in recent history and even today with the presence of automatic water heaters, there are many countries whose sales of water kettles are impressive.

In the past, efforts have been made to prevent the user from being scalded have been many and varied. In some instances the spout was removed a substantial distance from the body of the kettle and on others the handle was deliberately located a safe distance from the spout.

Some efforts have been directed to providing a spout flap or baffle to deflect the steam away from the handle in instances where the handle and spout were closely located to one another. In some cases the baffle or flap was spring loaded and required the use of a finger or lever to open the spout when adding water to the kettle.

SUMMARY OF THE INVENTION

The present invention is directed to a so called "low profile" kettle in which the handle and spout are closely located one to the other. Because of the peculiarities of the design of the kettle, a counterbalanced spout flap was provided for the protection of the user. The spout flap has a flat portion which blocks a substantial portion of the spout opening in the region adjacent the handle.

By molding the flap from plastic or some other suitable material, the flap is arranged to have a counterbalancing weight molded integrally thereto so that the force of gravity keeps the spout closed when in a normal carrying or pouring position. The cross sectional profile of the flap is somewhat L-shaped to provide the needed counterbalancing function.

BRIEF DESCRIPTION OF DRAWINGS

FIG. 1 is a perspective view of a kettle having a flap as described in this application;

FIG. 2 is a partial sectional view of a portion of a kettle and spout which is the subject of this invention; and FIG. 3 is a partial elevational view of the kettle and of the spout flap of this invention.

DESCRIPTION OF PREFERRED EMBODIMENT OF INVENTION

Referring to FIG. 1 which illustrates a kettle 10 of this invention in a partial perspective view, it will be seen that the kettle itself is fabricated from three pieces, a lid portion 12 having a handle 14 integrally mounted therewith, a bowl portion 16 preferably fabricated from metal or other similar material. Bowl 16 is supplied with a heater means which means generally comprises a sheath-type electrical heater mounted within said bowl.

A foot or platform 18 is secured to bowl 16 to provide a thermal barrier between bowl 16 and the surface upon which the kettle is placed.

Lid portion 12 which may be fabricated from a thermoplastic or other suitable material and is arranged to be fastened to bowl 16 in any suitable manner such as by clamps, screws, etc. placed at suitable locations around the periphery of the lid.

Located immediately in front of the handle 14 is a spout 20 which is partially blocked by a spout flap 22 which is arranged to block that portion of the spout immediately adjacent handle 14. Spout flap 22 is more clearly illustrated in FIGS. 2 and 3. It will be seen that flap 22 is essentially formed from a single piece of thermoplastic material. Flap 22 is integrally cast with arm 24 which is connected to pivot portion 26 which in turn is connected to counterbalancing portion 28.

A stationary pivot hinge 30 is molded integrally in the lower surface of lid 12 which is fitted with a circular hole which serves as a bearing for pivot 32. There are two such pivot hinge members 30 and spout 22 is provided with two bearing pivots 32 and 34 respectively which are mounted in the pivot hinge members 30 in such a manner as to permit rotation of said flap about said pivot points. Counterbalancing member 28 is formed to extend in such a direction and at such an angle that flap 22 is counterbalanced to the closed position at times when the kettle is in its normal horizontal position or in its inclined pouring position. By this means the hand of the user is protected from any steam emitted therefrom. It will be noted that the function of the flap 22 is twofold. Firstly, the flap 22 when in the closed position provides egress for any emitted steam which is some distance from the handle. Secondly, any steam allowed to leave the vessel 16 is now directed out the spout away from the user to provide added protection to the user.

In addition, it will be found that spout flap 22 may be conveniently depressed by a water faucet nozzle when it is desired to fill the vessel 16. It is noted that the fill opening which results from this operation is of such size that the kettle may be rapidly filled without impediment.

That the flap construction and operation is so simple and unencumbered by springs, levers, etc., merely serves to exemplify the overall simplicity of the invention and the successful operation thereof. The flap in this case is illustrated with an additional counterweight mounted thereon. This additional weight may be excluded if the arm 28 is molded in such a manner to include more molding material to provide more counterbalance.

In the hostile environment to which this flap is subjected the problems of fouling and poor operation have largely been overcome by the choice of a simple operating mechanism.

It will appear obvious to those skilled in the art that various alternatives are possible and other departures are apparent, however the applicants prefer to base the limitations of their invention in the scope of the following claims.

The embodiments of the invention in which an exclusive property or privilege is claimed are defined as follows:

1. In a kettle used for heating and boiling liquids, spout flap means mounted in a working relationship in the interior of said kettle, said kettle being formed of a bowl shaped vessel, which has a circular lid portion secured thereto at the upper periphery of said vessel, said lid portion being of a shallow truncated conical shape at the periphery terminating in a flat circular surface at the center of said lid portion, said lid having a handle means and spout means formed integrally therein, said handle means and spout means being axially aligned on a diameter of said lid portion, said spout means being molded on the periphery of said lid, said spout means having a generally flat horizontal top perimeter in said lid of such size that said kettle may be easily filled from a standard kitchen water faucet, said flap means is generally L-shaped in cross-section with one leg thereof comprising a blocking portion and an arm portion, said blocking portion having a perimeter which fits closely in said top perimeter of said spout means to close the part of said top perimeter immediately forward of the handle, said arm portion being planarly offset downwardly from said blocking portion, the other leg of said flap means comprising a counterweight leg, said flap means being pivotally connected to the underside of said lid portion at the junction of said legs so said counterweight leg urges said arm portion to abut said underside of said lid portion below said handle when said kettle is in its normal at rest position or in a pouring disposition, said flap means being pivotal in a direction counter to the urging of said counterweight leg upon pressing against said blocking portion with a water faucet for filling of said kettle.

* * * * *